E. Webber,
Horse-Collar Fastener.
No. 76,858.  Patented Apr. 14, 1868.
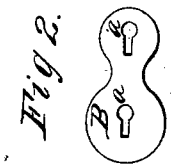
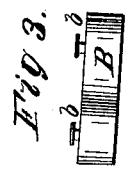
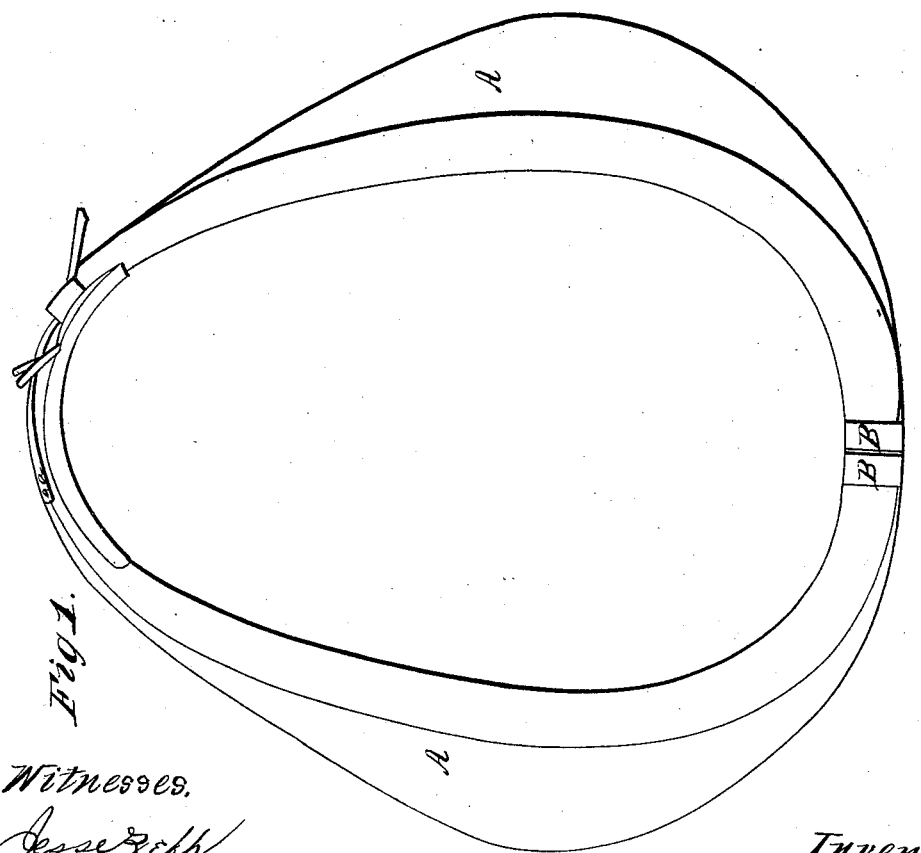
Witnesses.
Jesse Zepp
James R. Ditch
Inventor.
Eugene Webber per his
Atty G. B. Fowler

United States Patent Office.

EUGENE WEBBER, OF PORTAGE, MICHIGAN.

Letters Patent No. 76,858, dated April 14, 1868.

IMPROVED HORSE-COLLAR.

The Schedule referred to in these Letters Patent and making part of the same.

TO ALL WHOM IT MAY CONCERN:

Be it known that I, EUGENE WEBBER, of Portage, in the county of Kalamazoo, and State of Michigan, have invented a new and useful Improvement in Horse-Collars; and I do hereby declare that the following is a full, clear, and exact description of the construction and operation of the same, reference being had to the accompanying drawings, making a part of this specification, in which—

Figure 1 is a front view of the collar.

Figures 2 and 3, views in detail of device for fastening collar.

My invention consists in the construction of metallic boxes, with elongated slots, having round holes at each end of the slots, and shanks with flat heads; the collar being opened at the bottom, and the said boxes being suitably attached to the ends thereof, and the collar placed around the horse's neck. The ends of the collar are fastened together by the insertion of the heads in the slots, thus obviating the inconvenience of placing the collar over the horse's head.

To enable any one skilled in the art to make and use my invention, I will proceed to describe its construction and operation.

A is the collar, B B are the boxes. The collar being made open at the bottom, the boxes are suitably attached to the ends thereof. $a\,a$ are two round holes, made at the ends of the elongated slots. $b\,b$ are the shanks, with flat heads.

The collar is placed around the horse's neck, instead of being slipped over the head, as heretofore; the flat heads are slipped into the holes, and then pushed back a little, until the heads come across the slots which hold them and thus the ends of the collar together.

The process is at once simple, no spring or other device being required to accomplish the purpose.

Claim.

Having thus fully described my invention, what I claim therein as new, and desire to secure by Letters Patent, is—

The metallic boxes B B, with elongated slots $a\,a$, and shanks $b\,b$, as constructed and arranged for fastening the collar in the manner as described and shown.

EUGENE WEBBER.

Witnesses:
W. G. HOWARD,
W. O. BALCH.